United States Patent
Kim et al.

(10) Patent No.: US 11,528,072 B2
(45) Date of Patent: Dec. 13, 2022

(54) METHOD FOR CONTROLLING BEAM AND ELECTRONIC DEVICE THEREFOR

(71) Applicant: Samsung Electronics Co., Ltd., Suwon-si (KR)

(72) Inventors: Taeyoon Kim, Suwon-si (KR); Chaeman Lim, Suwon-si (KR); Mingyu Kang, Suwon-si (KR); Junyoung Woo, Suwon-si (KR); Youngpo Lee, Suwon-si (KR); Hyoungjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 17/269,761

(22) PCT Filed: Sep. 3, 2019

(86) PCT No.: PCT/KR2019/011305
§ 371 (c)(1),
(2) Date: Feb. 19, 2021

(87) PCT Pub. No.: WO2020/055022
PCT Pub. Date: Mar. 19, 2020

(65) Prior Publication Data
US 2021/0306058 A1    Sep. 30, 2021

(30) Foreign Application Priority Data
Sep. 13, 2018  (KR) .................... 10-2018-0109550

(51) Int. Cl.
*H04B 7/08* (2006.01)
*H04B 7/0408* (2017.01)

(52) U.S. Cl.
CPC ............. *H04B 7/08* (2013.01); *H04B 7/0408* (2013.01)

(58) Field of Classification Search
CPC ........ H04B 7/08; H04B 7/0408; H04B 7/022; H04B 7/088; H04B 7/0695; H04B 7/0857; H04B 7/086
See application file for complete search history.

(56) References Cited

U.S. PATENT DOCUMENTS

| | | | |
|---|---|---|---|
| 7,457,587 B2 | 11/2008 | Chung | |
| 9,648,536 B2 | 5/2017 | Kang et al. | |
| 9,900,891 B1* | 2/2018 | Islam | H04W 72/046 |
| 10,396,874 B1* | 8/2019 | Garrett | H04W 64/006 |
| 2010/0272018 A1 | 10/2010 | Furueda et al. | |
| 2013/0059620 A1 | 3/2013 | Cho | |

(Continued)

FOREIGN PATENT DOCUMENTS

| | | | | |
|---|---|---|---|---|
| CN | 107896123 A | * | 4/2018 | ............... H04B 7/04 |
| CN | 109392091 A | * | 2/2019 | ............ H04W 68/00 |

(Continued)

*Primary Examiner* — Jean B Corrielus
(74) *Attorney, Agent, or Firm* — Jefferson IP Law, LLP

(57) ABSTRACT

An electronic device according to various embodiments of the present invention may include a communication circuit, and a processor operatively connected with the communication circuit, and the processor may be configured to detect that a reception beam for a first base station is changed, and change a reception beam for a second base station based on first change information of the reception beam for the first base station. Other embodiments are also possible.

13 Claims, 16 Drawing Sheets

(56) References Cited

U.S. PATENT DOCUMENTS

| | | | |
|---|---|---|---|
| 2013/0065622 A1 | 3/2013 | Hwang | |
| 2017/0288763 A1 | 10/2017 | Yoo et al. | |
| 2017/0302341 A1* | 10/2017 | Yu | ............... H04B 7/0617 |
| 2019/0081692 A1* | 3/2019 | Wong | ............... H04W 16/28 |

FOREIGN PATENT DOCUMENTS

| | | | | |
|---|---|---|---|---|
| CN | 110089152 A | * | 8/2019 | ............... H04B 7/04 |
| CN | 107135021 B | * | 10/2021 | ............... H04B 7/04 |
| KR | 10-2013-0025704 A | | 3/2013 | |
| KR | 10-1498940 B1 | | 3/2015 | |
| KR | 10-1884332 B1 | | 8/2018 | |
| WO | 2010/025148 A1 | | 3/2010 | |

* cited by examiner

METHOD FOR CONTROLLING BEAM AND ELECTRONIC DEVICE THEREFOR

TECHNICAL FIELD

Various embodiments of the present invention relate to a method for controlling a beam and an electronic device thereof.

BACKGROUND ART

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

DISCLOSURE OF INVENTION

Technical Problem

In general, an electronic device may update a reception (RX) beam for receiving a signal, based on a training signal received at a designated period from a base station. Such an electronic device may store information of neighboring base stations, a signal state, and information of TX beams of the neighboring base stations and the RX beam of the electronic device for each of the neighboring base stations to support seamless communication even in a mobile situation. The TX beams of the neighboring base stations do not significantly change due to a distance between the electronic device and the neighboring base stations, whereas the RX beam of the electronic device may be changed considerably according to a posture change of the electronic device. Hence, the electronic device needs to perform a beam training operation which searches for the RX beam for each neighboring base station every time the posture of the electronic device changes. Data transmission and reception between the electronic device and a serving base station is affected while the electronic device searches for the RX beam for the neighboring base stations, and its effect may increase as the number of the neighboring base stations for the RX beam search increases.

Various embodiments of the present invention disclose a method for minimizing an operation for searching an RX beam for each of neighboring base station in an electronic device.

Solution to Problem

An electronic device according to various embodiments of the present invention may include a communication circuit, and a processor operatively connected with the communication circuit, wherein the processor may be configured to detect that a reception beam for a first base station is changed, and change a reception beam for a second base station based on first change information of the reception beam for the first base station.

An operating method of an electronic device According to various embodiments of the present invention may include detecting that a reception beam for a first base station is changed and changing a reception beam for a second base station based on first change information of the reception beam for the first base station.

Advantageous Effects of Invention

Various embodiments of the present invention may reduce data transmission and reception deterioration between an electronic device and a serving base station, by minimizing an operation of searching for a reception (RX) beam for each of neighboring base station in the electronic device.

Various embodiments of the present invention may reduce current consumption caused by RX beam search, by minimizing an operation of searching for an RX beam for each of neighboring base stations in an electronic device.

BEST MODE FOR CARRYING OUT THE INVENTION

A hardware approach will be described as an example in various embodiments of the present invention to be described below. However, since the various embodiments of the present invention include a technology which uses both hardware and software, the various embodiments of the present invention do not exclude a software-based approach.

Figure 1:
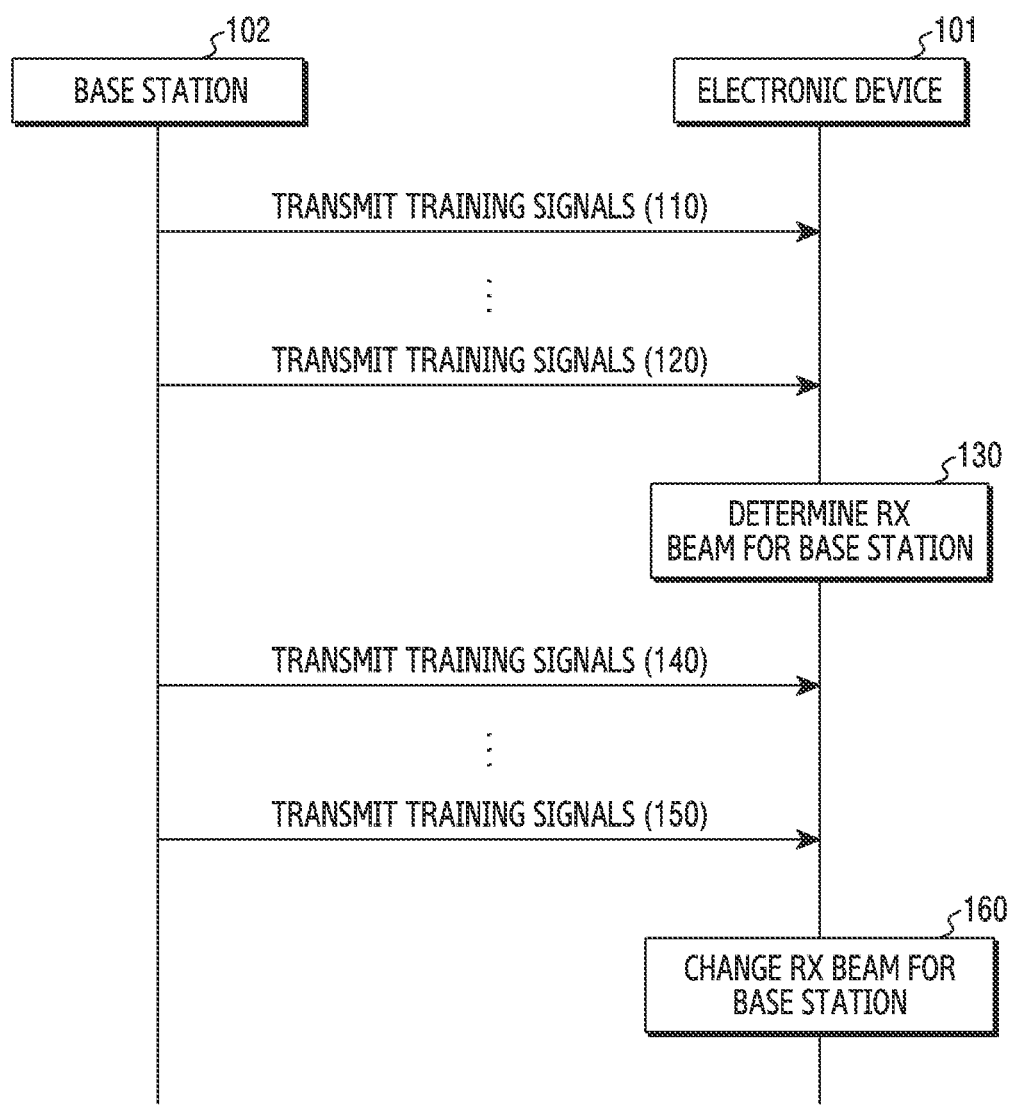
FIG. 1 illustrates an example of signal flows between an electronic device and a base station according to various embodiments.

FIG. 1 illustrates an example of signal flows between an electronic device and a base station according to various embodiments.

According to various embodiments, an electronic device 101 may be a device which receives a wireless communication service from a base station 102. According to various embodiments, the electronic device 101 may be a device having mobility. For example, the electronic device 101 may include a mobile phone, a smart phone, a music player, a portable game console, a navigation system, or a laptop computer. According to various embodiments, the electronic device 101 may be referred to as a mobile station, a terminal station (STA), or a user equipment.

According to various embodiments, the base station 102 may provide the wireless communication service to the electronic device 101. According to various embodiments, the base station 102 may be referred to as a base station, an enhanced Node B (eNB), or an access point (AP).

Referring to FIG. 1, in operation 110, the base station 102 may transmit a plurality of training signals to the electronic device 101 through a plurality of beams of the base station 102. The training signal may be a signal for determining a transmission (TX) beam (e.g., a best TX beam) of the base station 102 among a plurality of beams of the base station 102 and/or a reception (RX) beam (e.g., a best RX beam) of the electronic device 101 for communication with the electronic device 101. According to various embodiments, the training signal may be referred to as a reference signal, a beam reference signal (BRS), or a synchronization signal block (SSB). The electronic device 101 may receive a plurality of training signals transmitted from the base station 102 through one of a plurality of beams (e.g., a first beam through an n-th beam) of the electronic device.

In operation 120, the base station 102 may transmit a plurality of training signals to the electronic device 101 through the plurality of the beams of the base station 102. The electronic device 101 may receive the plurality of the training signals transmitted from the base station 102 through another one of the plurality of the beams of the electronic device 101.

In operation 130, the electronic device 101 may determine an RX beam for the base station 102 among the plurality of the beams of the electronic device 101. For example, the electronic device 101 may determine a strength value of the signal transmitted from the base station 102 for each of the plurality of the beams of the electronic device 101 based on information related to transmission power of the base station 102 included in the training signal. The electronic device 101 may determine the beam having the greatest strength value of the signal transmitted from the base station 102 among the plurality of the beams of the electronic device 101 as the RX beam for the base station 102.

In operation 140, the base station 102 may transmit a plurality of training signals to the electronic device 101 through the plurality of the beams of the base station 102. The electronic device 101 may receive the plurality of the training signals transmitted from the base station 102 through one of the plurality of the beams of the electronic device 101.

In operation 150, the base station 102 may transmit a plurality of training signals to the electronic device 101 through the plurality of the beams of the base station 102. The electronic device 101 may receive the plurality of the training signals transmitted from the base station 102 through another one of the plurality of the beams of the electronic device 101.

In operation 160, the electronic device 101 may change the RX beam for the base station 102. For example, if a state of a path between the electronic device 101 and the base station 102 is changed due to a posture change of the electronic device 101, the beam having the lowest path loss value among the plurality of the beams of the electronic device 101 may be different from the beam determined in operation 130. Hence, the electronic device 101 may change the RX beam for the base station 102 to other beam based on the state change of the path between the electronic device 101 and the base station 102.

According to various embodiments, operation 110 through operation 120 and operation 140 through operation 150 may be referred to as beam training, beam signaling, or beam measurement.

According to various embodiments, the electronic device 101 may determine the best or preferred RX beam for the base station 102 through the beam training even if the path between the electronic device 101 and the base station 102 is changed in type.

Figure 2A:
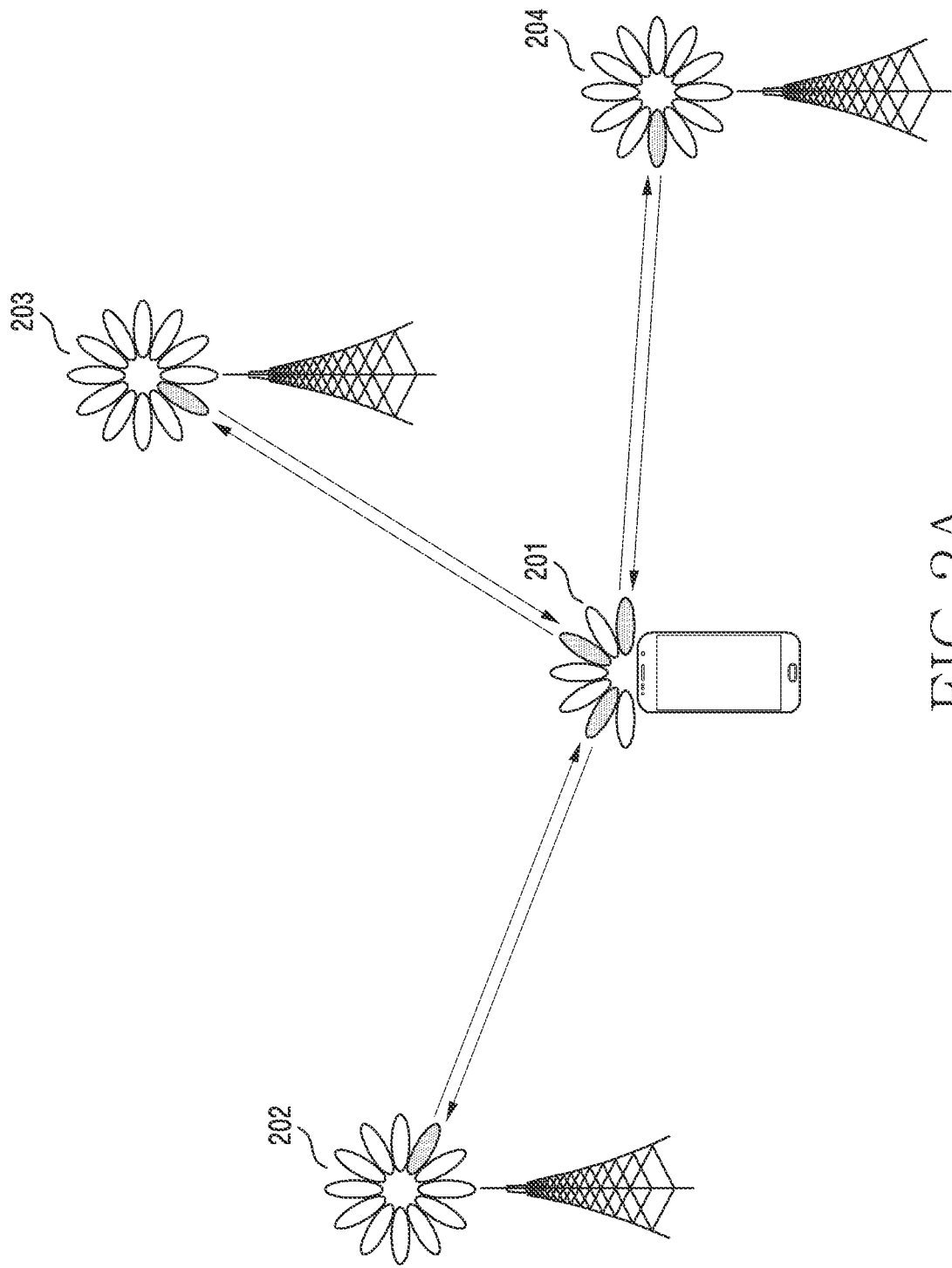
FIG. 2A and FIG. 2B are diagrams for illustrating a method for changing a reception (RX) beam based on a posture change of an electronic device in the electronic device according to various embodiments.
Figure 2B:
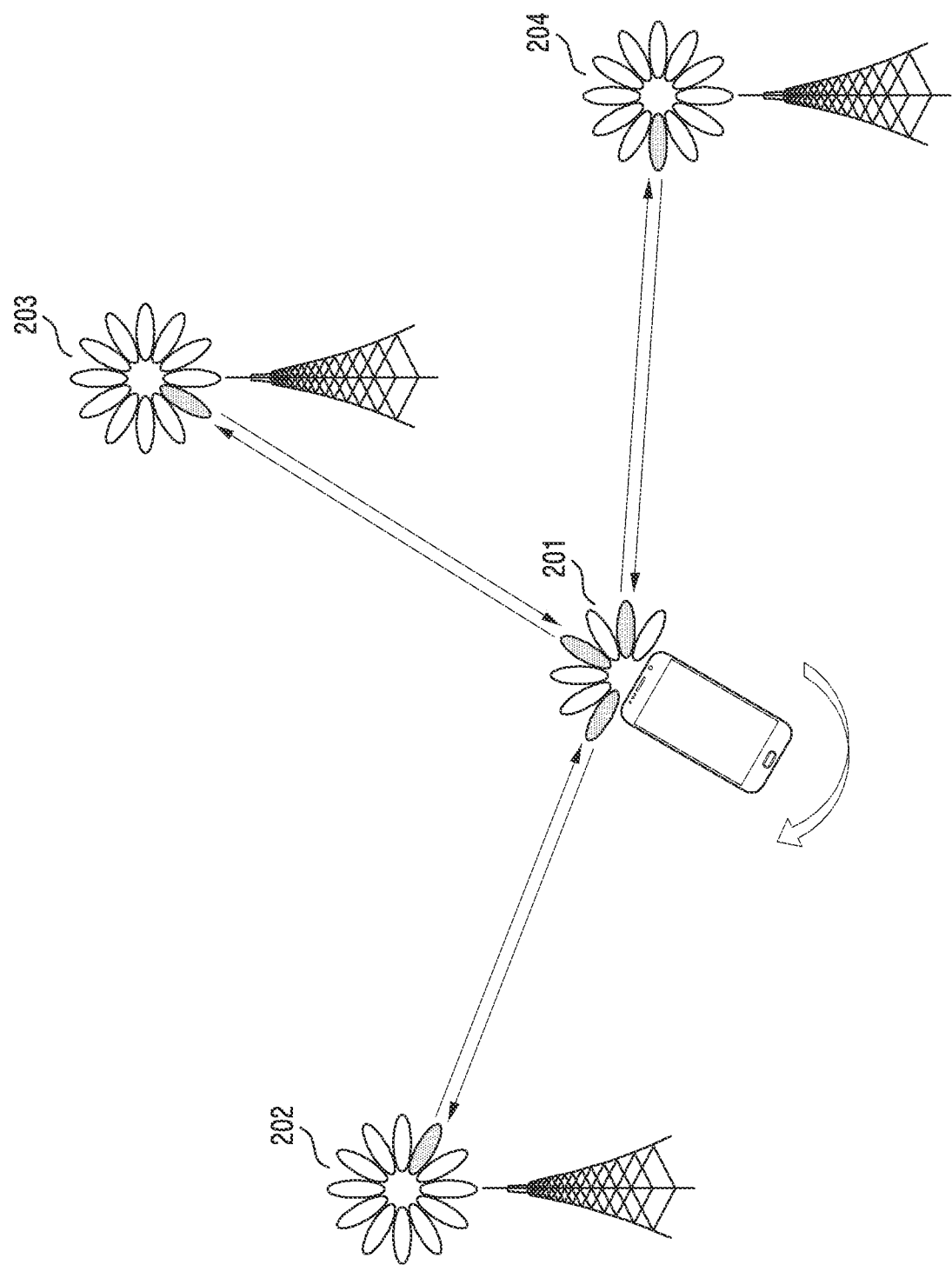

FIG. 2A and FIG. 2B are diagrams for illustrating a method for changing an RX beam based on a posture change of an electronic device in the electronic device according to various embodiments.

Referring to FIG. 2A, an electronic device 201 (e.g., the electronic device 101 of FIG. 1) may determine an RX beam for communicating with first through third base stations 202 through 204 located near the electronic device 201. For example, by performing the beam training shown in FIG. 1, the electronic device 201 may determine the RX beam for each of the first base station 202 (e.g., the base station 102 of FIG. 1), the second base station 203 (e.g., the base station 102 of FIG. 1), and the third base station 204 (e.g., the base station 102 of FIG. 1). At least one of the first through third base stations 202 through 204 located near the electronic device 201 may be a serving base station which provides a wireless communication service to the electronic device 201.

In general, TX beams of the first through third base stations 202 through 204 determined through the above-described beam training do not considerably change due to the distance between the first through third base stations 202 through 204 and the electronic device 201 even if the posture of the electronic device 201 changes. By contrast, the RX beam of the electronic device 201 for the first through third base stations 202 through 204 may be changed significantly according to a posture change of the electronic device 201. For example, as shown in FIG. 2B, if the posture of the electronic device 201 is changed, the TX beams of the first through third base stations 202 through 204 do not change, whereas the RX beam of the electronic device 201 for the first through third base stations 202 through 204 may be changed to a beam which is different from the RX beam before the posture change of the electronic device 101.

According to an embodiment, if the posture of the electronic device 201 is changed, the electronic device 201 may perform the beam training for each of the first through third base stations 202 through 204 to determine the RX beam for each of the first through third base stations 202 through 204 located near the electronic device 201. Hence, as the number of the base stations located around the electronic device 201 increases, the time for performing the beam training increases. Since the electronic device 201 may not transmit and receive data to or from the transmit base station through the best or preferred beam during the beam training, a method for reducing the beam training time is required to minimize such a problem.

Figure 3:
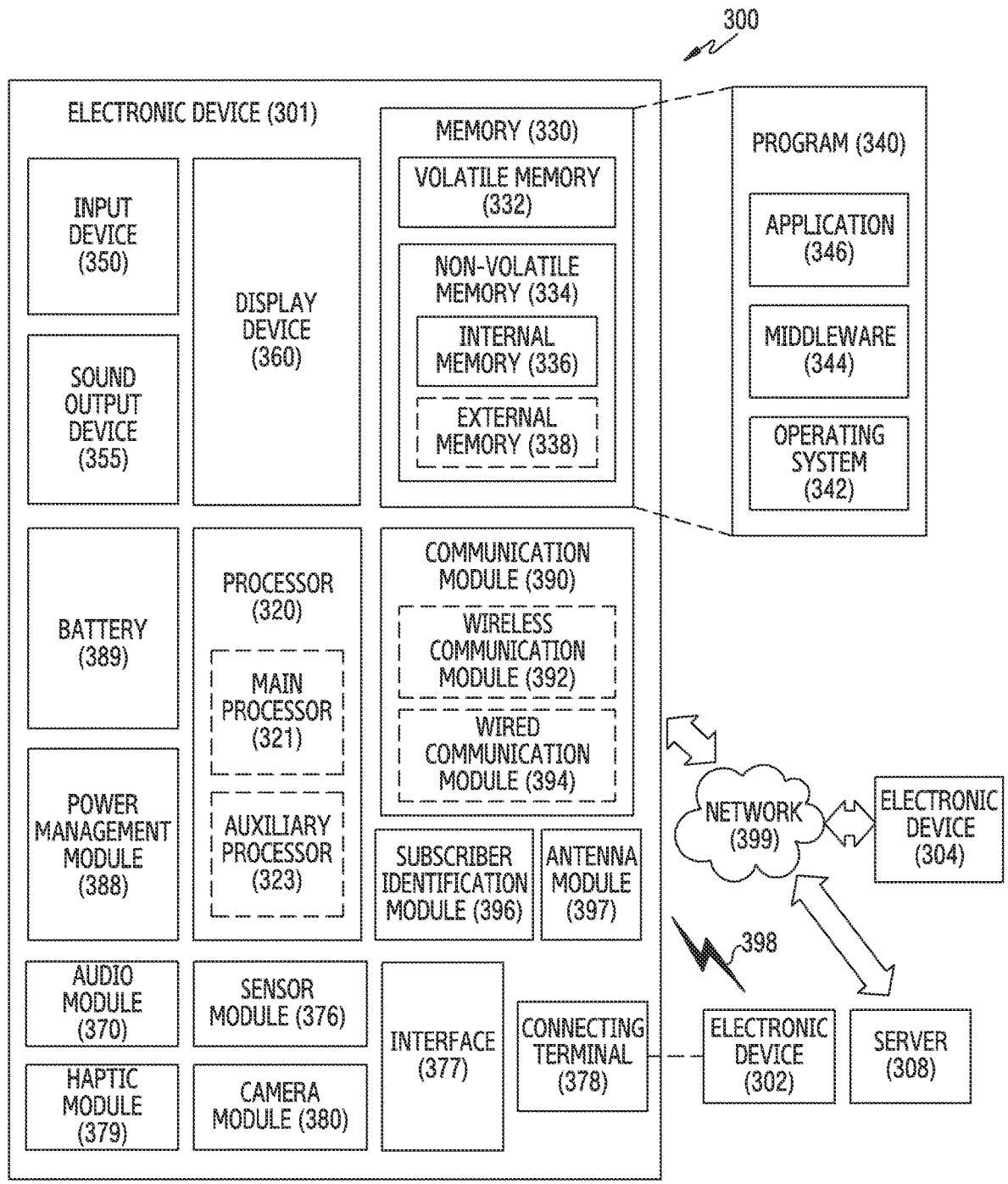
FIG. 3 is a block diagram of an electronic device in a network environment according to various embodiments.

FIG. 3 is a block diagram of an electronic device in a network environment according to various embodiments.

Referring to FIG. 3, an electronic device 301 (e.g., the electronic device 101 or 201) in a network environment 300 may communicate with an electronic device 302 over a first network 398 (e.g., a short-range wireless communication network), or with an electronic device 304 or a server 308 over a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module 396, or an antenna module 397. In some embodiments, in the electronic device 301, at least one (e.g., the display device 360 or the camera module 380) of the components may be omitted, or one or more other components may be added. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may, for example, control at least one other component (e.g., a hardware or software component) of the electronic device 301 coupled with the processor 320 by executing software (e.g., a program 340), and perform various data processing or calculations. According to an embodiment, as at least part of the data processing or calculation, the processor 320 may load a command or data received from other component (e.g., the sensor module 376 or the communication module 390) in a volatile memory 332, process the command or the data stored in the volatile memory 332, and store resulting data in a non-volatile memory 334. According to an embodiment, the processor 320 may include a main processor 321 (e.g., a central processing unit or an application processor), and an auxiliary processor 323 (e.g., a graphics processing unit, an image signal processor, a sensor hub processor, or a communication processor) which is operable independently or in conjunction. Additionally or alternatively, the auxiliary processor 323 may be configured to consume less power than the main processor 321, or to be specialized to a designated function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, for example, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of other component (e.g., the camera module 380 or the communication module 390) functionally related.

The memory 330 may store various data used by at least one component (e.g., the processor 320 or the sensor module 376) of the electronic device 301. The data may include, for example, software (e.g., the program 340), and input data or output data for a command related thereto. The memory 330 may include the volatile memory 332 or the non-volatile memory 334.

The program 340 may be stored as software in the memory 330, and may include, for example, an operating system 342, middleware 344 or an application 346.

The input device 350 may receive a command or data to be used by other component (e.g., the processor 320) of the electronic device 301, from outside (e.g., a user) of the electronic device 301. The input device 350 may include, for example, a microphone, a mouse, or a keyboard.

The sound output device 355 may output a sound signal to the outside of the electronic device 301. The sound output device 355 may include, for example, a speaker or a receiver. The speaker may be used for a general purpose such as multimedia play or record play, and the receiver may be used to receive an incoming call. According to an embodiment, the receiver may be implemented separately from, or as part of the speaker.

The display device 360 may visually provide information to the outside (e.g., the user) of the electronic device 301. The display device 360 may include, for example, a display, a hologram device, or a projector and control circuitry for controlling a corresponding device. According to an embodiment, the display device 360 may include touch circuitry configured to detect a touch, or sensor circuitry (e.g., a pressure sensor) configured to measure an intensity of force generated by the touch.

The audio module 370 may convert a sound into an electrical signal, or vice versa. According to an embodiment, the audio module 370 may obtain the sound via the input device 350, or output the sound through the sound output device 355, or an external electronic device (e.g., the electronic device 302) (e.g., a speaker or a headphone) directly or wirelessly coupled with the electronic device 301.

The sensor module 376 may detect an operational state (e.g., power or temperature) of the electronic device 301, or an external environmental state (e.g., a user state), and generate an electrical signal or a data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more designated protocols to be used to connect the electronic device 301 with the external electronic device (e.g., the electronic device 302) directly or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector through which the electronic device 301 may be physically connected with the external electronic device (e.g., the electronic device 302). According to an embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by the user via his/her tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable or a fuel cell.

The communication module 390 may support establishment of a direct (e.g., wired) communication channel or a wireless communication channel between the electronic device 301 and the external electronic device (e.g., the electronic device 302, the electronic device 304, or the server 308) and communication over the established communication channel. The communication module 390 may include one or more communication processors which are operable independently from the processor 320 (e.g., the application processor) and supports the direct (e.g., wired) communication or the wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication module). A corresponding communication module of these communication modules may communicate with the external electronic device via the first network 398 (e.g., a short-range communication network such as Bluetooth, wireless-fidelity (Wi-Fi) direct, or infrared data association (IrDA)) or the second network 399 (e.g., a long-range communication network such as a cellular network, Internet, or a computer network (e.g., LAN or wide area network (WAN)). These communication modules of various types may be integrated as a single component (e.g., a single chip), or may be implemented as multi components (e.g., multi chips) separated from each other. The wireless communication module 392 may identify and authenticate the electronic device 301 in the communication network such as the first network 398 or the second network 399 using subscriber information (e.g., international mobile subscriber identity (IMSI)) stored in the subscriber identification module 396.

The antenna module 397 may transmit or receive a signal or power to or from the outside (e.g., the external electronic device). According to an embodiment, the antenna module 397 may include one or more antennas, and, therefrom, at least one antenna appropriate for a communication scheme used in the communication network such as the first network 398 or the second network 399, may be selected, for example, by the communication module 390. The signal or the power may be transmitted or received between the communication module 390 and the external electronic device via the selected at least one antenna.

At least some of the above components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 connected to the second network 399. The electronic devices 302 and 304 each may be a device of the same type as or a different type from the electronic device 301. According to an embodiment, all or some of operations to be executed at the electronic device 301 may be executed at one or more external electronic devices of the external electronic devices 302, 304, or 308. For example, if the electronic device 301 needs to perform a function or a service automatically, or in response to a request from the user or other device, the electronic device 301 may, instead of or in addition to executing the function or the service, request the one or more external electronic devices to perform at least part of the function or the service. The one or more external electronic devices receiving the request may perform the at least part of the function or the service requested, or an additional function or service related to the request, and transfer an execution result to the electronic device 301. The electronic device 301 may provide the result, with or without further processing, as at least part of a reply to the request. To this end, for example, cloud computing, distributed computing, or client-server computing technology may be used.

The electronic device according to various embodiments in the present disclosure may be a device of various types. The electronic device may include, for example, a portable communication device (e.g., a smart phone), a computer device, a portable multimedia device, a portable medical device, a camera, a wearable device, or a home appliance. The electronic devices according to an embodiment of the disclosure are not limited to those described above.

It should be appreciated that various embodiments of the present disclosure and the terms used therein are not intended to limit the technological features set forth in the disclosure to particular embodiments, and include various changes, equivalents, or replacements of a corresponding embodiment. With regard to the description of the drawings, similar reference numerals may be used to refer to similar or related elements. A singular form of a noun corresponding to an item may include one or more of the items, unless the relevant context clearly indicates otherwise. In the disclosure, each of such phrases as "A or B," "at least one of A and B," "at least one of A or B," "A, B, or C," "at least one of A, B, and C," and "at least one of A, B, or C," may include all possible combinations of the items enumerated together with a corresponding one of the phrases. Such terms as "1st" and "2nd," or "first" and "second" may be used to simply distinguish a corresponding component from another component, and does not limit the components in other aspect (e.g., importance or order). If an element (e.g., a first element) is referred to, with or without the term "operatively" or "communicatively", as "coupled," or "connected" to another element (e.g., a second element), it means that the element may be coupled with the other element directly (e.g., wiredly), wirelessly, or via a third element.

Figure 4:
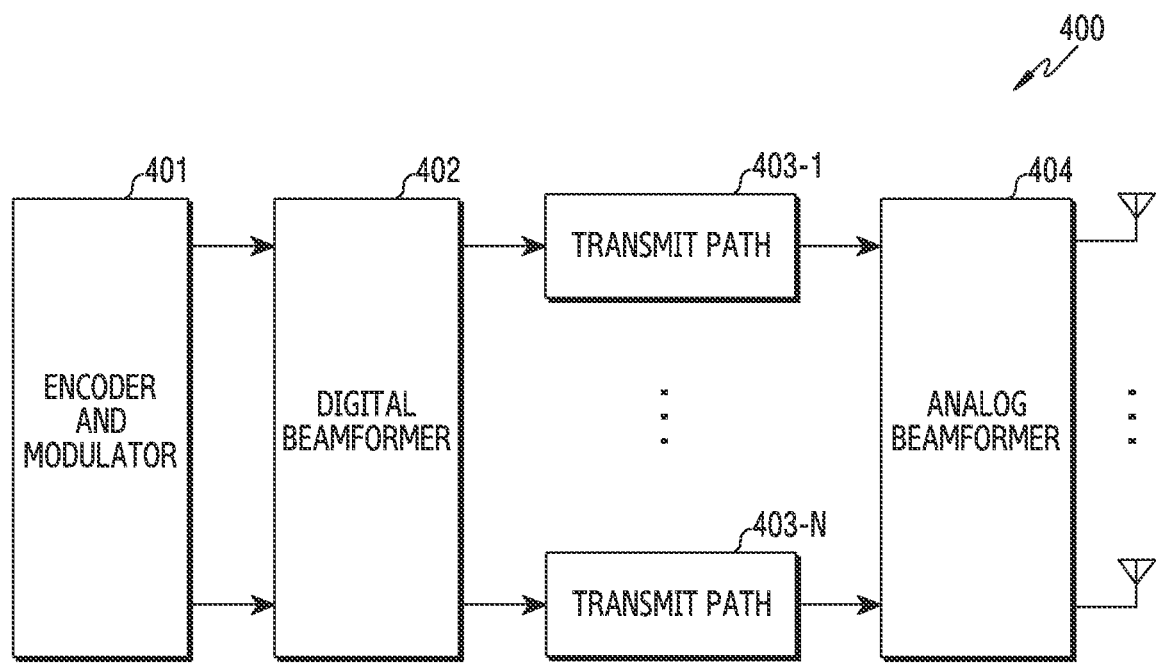
FIG. 4 is a block diagram of a wireless communication module according to various embodiments.

FIG. 4 is a block diagram of a wireless communication module according to various embodiments.

Referring to FIG. 4, a wireless communication unit 400 (e.g., the wireless communication module 392) may include an encoder and modulator 401, a digital beamformer 402, a plurality of transmit paths 403-1 through 403-N, and an analog beamformer 404.

According to various embodiments, the encoder and modulator 401 may perform channel encoding. For the channel encoding, the encoder and modulator 401 may use at least one of low density parity check (LDPC) code, convolution code, or polar code. The encoder and modulator 401 may generate modulation symbols through constellation mapping.

According to various embodiments, the digital beamformer 402 may beamform a digital signal (e.g., the modulation symbols). For doing so, the digital beamformer 402 may multiply the modulation symbols by beamforming weights. For example, the beamforming weights are used to change an amplitude and a phase of a signal, and may be referred to as 'a precoding matrix' or 'a precoder'. The digital beamformer 402 may output the digital-beamformed modulation symbols to the plurality of the transmit paths 403-1 through 403-N. In so doing, according to a multiple input multiple output (MIMO) transmission scheme, the modulation symbols may be multiplexed, or the same modulation symbols may be provided to the plurality of the transmit paths 403-1 through 403-N.

According to various embodiments, the plurality of the transmit paths 403-1 through 403-N may convert the digital-beamformed digital signals to analog signals. For doing, the plurality of the transmit paths 403-1 through 403-N each may include an inverse fast fourier transform (IFFT) operator, a cyclic prefix (CP) adder, a digital to analog converter (DAC), and/or an up-converter. The CP adder is used for the orthogonal frequency division multiplexing (OFDM) scheme, and may be excluded if other physical layer scheme (e.g., filter bank multi-carrier (FBMC)) is applied. For example, the plurality of the transmit paths 403-1 through 403-N may provide an independent signal process for a plurality of streams generated through the digital beamforming. As another example, depending on the implementation, some of the components of the transmit paths 403-1 through 403-N may be used in common.

According to various embodiments, the analog beamformer 404 may perform the beamforming on an analog signal. For doing so, the digital beamformer 402 may multiply the analog signals by beamforming weights. Herein, the beamforming weights may be used to change the amplitude and the phase of the signal. In an embodiment, the analog beamformer 404 may be variously formed, according to a connection structure between the plurality of the transmit paths 403-1 through 403-N and antennas. For example, each of the plurality of the transmit paths 403-1 through 403-N may be connected to one antenna array. As another example, the plurality of the transmit paths 403-1 through 403-N may be connected to one antenna array. As another example, the plurality of the transmit paths 403-1 through 403-N may be adaptively connected to one antenna array, or two or more antenna arrays.

An electronic device according to various embodiments may include a communication circuit, and a processor operatively connected with the communication circuit, wherein the processor may be configured to detect that a reception beam for a first base station is changed, and change a reception beam for a second base station based on first change information of the reception beam for the first base station.

According to various embodiments, the processor may be configured to determine a plurality of candidate reception beams for the second base station based on the first change information, perform beam training on the plurality of the candidate reception beams, determine the reception beam for the second base station from the plurality of the candidate reception beams based on an execution result of the beam training, and change the reception beam for the second base station with the determined reception beam.

According to various embodiments, the processor may be configured to determine a plurality of candidate reception beams for the second base station based on the first change information, perform beam training on the plurality of the candidate reception beams, and if there is a candidate beam which receives a signal satisfying a reference signal strength among the plurality of the candidate reception beams, change the reception beam for the second base station with the candidate reception beam which receives the signal satisfying the reference signal strength.

According to various embodiments, the processor may be configured to, if there are multiple candidate reception beams which receive the signal satisfying the reference signal strength, change the candidate reception beam which receives the signal of the greatest signal strength value with the reception beam for the second base station.

According to various embodiments, the processor may be configured to, if there is no candidate reception beam which receives the signal satisfying the reference signal strength, determine the reception beam for the second base station, by performing beam training on a plurality of beams of the electronic device, and change the reception beam for the second base station with the determined beam.

According to various embodiments, the processor may be configured to change the reception beam for the third base station based on the first change information and second change information of the reception beam for the second base station.

According to various embodiments, the processor may be configured to identify a posture change of the electronic device based on the first change information and the second change information, determine the reception beam for the third base station from beambook information of the electronic device based on the posture change of the electronic device, and change the reception beam for the third base station with the determined beam.

According to various embodiments, the processor may be configured to identify a posture change of the electronic device based on the first change information and the second change information, determine a plurality of candidate reception beams for the third base station from beambook information of the electronic device based on the posture change of the electronic device, determine the reception beam for the third base station by performing beam training on the plurality of the candidate reception beams, and change the reception beam for the third base station with the determined beam.

According to various embodiments, the processor may be configured to, if a moving speed of the electronic device is equal to or greater than a reference moving speed, determine the reception beams for the first base station, the second base station, and the third base station, by performing beam training on the first base station, the second base station, and the third base station.

According to various embodiments, the first change information may include a 3-axis rotation value of the reception beam for the first base station, and the second change information may include a 3-axis rotation value of the reception beam for the second base station.

Figure 5A:
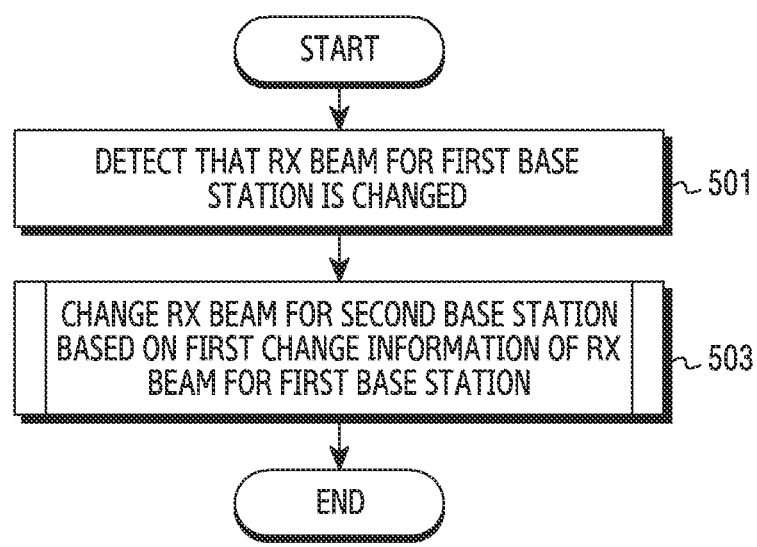
FIG. 5A is a flowchart illustrating an example of a method for changing an RX beam for a base station in an electronic device according to various embodiments.

FIG. 5A is a flowchart illustrating an example of a method for changing an RX beam for a base station in an electronic device according to various embodiments.

Referring to FIG. 5A, in operation 501, the electronic device (e.g., the electronic device 101, 201, or 301) may detect that an RX beam for a first base station (e.g., the base station 101 or the first base station 202) is changed. For example, as shown in FIG. 2A, the electronic device 201 may detect that the RX beam for the first base station 202 among the base stations is changed, after the RX beam for each of the base stations (e.g., the first base station 202, the second base station 203, and the third base station 204) located near the electronic device is determined. For example, as shown in FIG. 2B, if the state of the path between the electronic device 201 and the first base station 202 is changed due to the posture change of the electronic device 201, the RX beam of the electronic device 201 for the first base station 202 may be different from the RX beam before the electronic device 201 is changed in the posture. Hence, if the state of the path between the electronic device 201 and the first base station 202 is changed, the electronic device 201 may change the RX beam for the first base station 202 to other beam through the beam training. If the RX beam for the first base station 202 is changed, the electronic device 201 may identify first change information of the RX beam for the first base station 202. For example, the electronic device 201 may identify a change (e.g., a 3-axis rotation value) of the RX beam for the first base station 202 based on beambook information (or codebook information) of the electronic device 201.

In operation 503, the electronic device may change the RX beam for the second base station based on the first change information of the RX beam for the first base station. For example, as shown in FIG. 2B, if the state of the path between the electronic device 201 and the second base station 203 is changed due to the posture change of the electronic device 201, the electronic device 201 may determine a plurality of candidate RX beams for the second base station 203 from the beambook information based on the first change information of the RX beam for the first base station 202. The electronic device 201 may determine the RX beam for the second base station 203, by performing the beam training on a plurality of candidate RX beams. As another example, if the state of the path between the electronic device and the second base station 203 is changed due to the posture change of the electronic device 201, the electronic device 201 may determine a plurality of candidate RX beams for the second base station 203 from the beambook information based on the first change information of the RX beam for the first base station 202. By performing the beam training on the plurality of the candidate RX beams, the electronic device 201 may acquire a measurement (e.g., a signal strength) for each of the candidate RX beams, and determine whether there is a candidate RX beam which receives a signal over a reference signal strength. If there are one or more candidate RX beams which receive the signal over the reference signal strength, the electronic device 201 may determine the candidate RX beam receiving the signal of the greatest signal strength as the RX beam for the second base station 203. If there is no candidate RX beam for receiving the signal over the reference signal strength, the electronic device 201 may determine the RX beam for the second base station 203, by performing the beam training on the other beams than the candidate RX beam among the plurality of the beams of the electronic device 201.

According to various embodiments, the electronic device may determine a plurality of candidate RX beams for other base station based on the change information of the RX beams for one base station among the plurality of the neighboring base stations located near the electronic device, and perform the beam training on the candidate RX beam, thus reducing a time taken by the beam training compared with performing the beam training on all the neighboring base stations.

In an embodiment, it has been described on the assumption that the TX beams of the neighboring base stations (e.g., the first base station and the second base station) are not changed, but if a moving speed of the electronic device is greater than or equal to a reference speed, the TX beams of the neighboring base stations may be also changed, and accordingly the operations of FIG. 5A may be performed only if the moving speed of the electronic device is less than the reference speed. If the moving speed of the electronic device is equal to or greater than the reference speed, the electronic device may determine the RX beam for each of the neighboring base stations, by performing the beam training on each of the neighboring base stations. The moving speed of the electronic device may be obtained based on, for example, a modem of the electronic device or a sensor for measuring the moving speed (e.g., the sensor module 376).

In an embodiment, it has been described that operation 503 is conducted, if the electronic device detects that the RX beam for the first base station is changed, but, according to various embodiments, if the posture of the electronic device continuously changes, operation 503 may not be performed even though detecting that the RX beam for the first base station is changed. For example, if the electronic device detects that the RX beam for the first base station is changed, it may determine whether the posture of the electronic device is changing using a sensor (e.g., the sensor module 376), and may not perform operation 503, if the posture of the electronic device is changing.

Figure 5B:
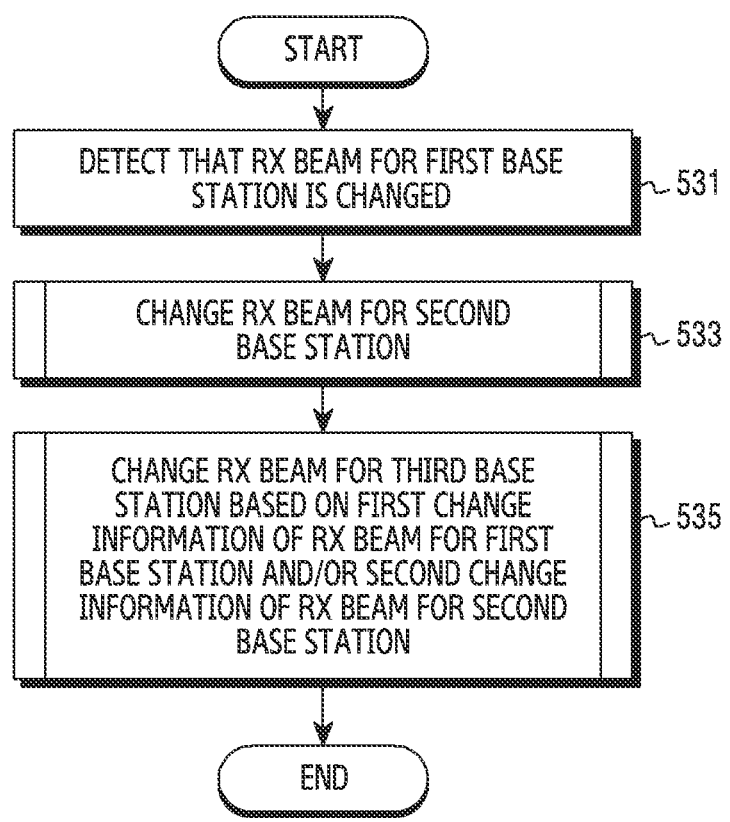
FIG. 5B is a flowchart illustrating another example of the method for changing the RX beam for the base station in the electronic device according to various embodiments.

FIG. 5B is a flowchart illustrating another example of the method for changing the RX beam for the base station in the electronic device according to various embodiments.

Referring to FIG. 5B, in operation 531, the electronic device (e.g., the electronic device 101, 201, or 301) may detect the change of the RX beam for the first base station (e.g., the base station 101 or the first base station 202). For example, as shown in FIG. 2A, the electronic device 201 may detect that the RX beam for the first base station 202 among the base stations is changed, after the RX beam for each of the base stations (e.g., the first base station 202, the second base station 203, and the third base station 204) located near the electronic device is determined. For example, as shown in FIG. 2B, if the state of the path between the electronic device 201 and the first base station 202 is changed due to the posture change of the electronic device 201, the RX beam of the electronic device 201 for the first base station 202 may be different from the RX beam before the electronic device 201 is changed in the posture. Hence, if the state of the path between the electronic device 201 and the first base station 202 is changed, the electronic device 201 may change the RX beam for the first base station 202 to other beam through the beam training. If the RX beam for the first base station 202 is changed, the electronic device 201 may identify first change information of the RX beam for the first base station 202. For example, the electronic device 201 may identify the change (e.g., a 3-axis rotation value) of the RX beam for the first base station 202 based on the beambook information (or the codebook information) of the electronic device 201.

In operation 533, the electronic device may change the RX beam for the second base station. For example, as shown in FIG. 2B, if the state of the path between the electronic device 201 and the second base station 203 is changed due to the posture change of the electronic device 201, the electronic device 201 may change the RX beam for the second base station 203 to other beam through the beam training. As another example, if the state of the path between the electronic device 201 and the second base station 203 is changed due to the posture change of the electronic device 201, the electronic device 201 may determine a plurality of candidate RX beams for the second base station 203 from the beambook information based on the first change information of the RX beam for the first base station 202. The electronic device 201 may determine the RX beam for the second base station 203, by performing the beam training on the plurality of the candidate RX beams. As yet another example, if the state of the path between the electronic device and the second base station 203 is changed by the posture change of the electronic device 201, the electronic device 201 may determine a plurality of candidate RX beams for the second base station 203 from the beambook information based on the first change information of the RX beam for the first base station 202. The electronic device 201 may perform the beam training on the plurality of the candidate RX beams, and thus acquire a measurement (e.g., a signal strength) for each of the candidate RX beams, and determine whether there is the RX beam which receives a signal over a reference signal strength. If there are one or more candidate RX beams receiving the signal over the reference signal strength, the electronic device 201 may determine the candidate RX beam receiving the signal of the greatest signal strength as the RX beam for the second base station 203. If there is no candidate RX beam for receiving the signal over the reference signal strength, the electronic device 201 may perform the beam training on the other beams than the candidate RX beam among the plurality of the beams of the electronic device 201, and thus determine the RX beam for the second base station 203. If determining the RX beam for the second base station 203, the electronic device may identify second change information of the RX beam for the second base station 203. For example, the electronic device 201 may identify a change (e.g., a 3-axis rotation value) of the RX beam for the second base station 203 based on the beambook information of the electronic device 201.

In operation 535, the electronic device may change the RX beam for the third base station based on the first change information of the RX beam for the first base station and/or the second change information for the RX beam for the second base station. For example, the electronic device may identify the posture change of the electronic device based on the first change information of the RX beam for the first base station and/or the second change information of the RX beam for the second base station, and determine (or change) the RX beam for the third base station from the beambook information based on the identified posture change. As another example, the electronic device may identify the posture change of the electronic device based on the first change information of the RX beam for the first base station and the second change information of the RX beam for the second base station, and determine a plurality of candidate RX beams for the third base station from the beambook information based on the identified posture change. The electronic device may determine (and change) the RX beam for the third base station, by performing the beam training only on the plurality of the candidate RX beams, or by performing the beam training first on the plurality of the candidate RX beams.

According to various embodiments, the electronic device may identify the posture of the electronic device based on the change information of the RX beams for two base stations among the plurality of the neighboring base stations located around the electronic device, change the RX beam for other base station among the plurality of the neighboring base stations based on the posture of the electronic device, and thus reduce the time taken by the beam training compared with performing the beam training on all the neighboring base stations.

In an embodiment, it has been described on the assumption that the first base station, the second base station, and the third base station are located near the electronic device, but the number of the neighboring base stations located around the electronic device may vary. For example, four or more neighboring base stations may be located around the electronic device. In this case, the electronic device may identify the posture change of the electronic device based on the change information of the RX beam for two neighboring base stations of four neighboring base stations located near the electronic device, and determine the RX beam for the remaining base stations, based on the posture change of the electronic device.

In an embodiment, it has been described on the assumption that the TX beams of the neighboring base stations (e.g., the first base station, the second base station, and the third base station) are not changed, but if the moving speed of the electronic device is higher than the reference speed, the TX beams of the neighboring base stations may also be changed, and accordingly operations of FIG. 5B may be carried out only if the moving speed of the electronic device is less than the reference speed. If the moving speed of the electronic device is equal to or greater than the reference speed, the electronic device may determine the RX beam for each of the neighboring base stations, by performing the beam training on each of the neighboring base stations. The moving speed of the electronic device may be obtained based on, for example, the modem of the electronic device or the sensor for measuring the moving speed (e.g., sensor module 376).

In an embodiment, it has been described that operation 533 through operation 535 are performed, if the electronic device detects that the RX beam for the first base station is changed, but according to various embodiments, if the posture of the electronic device continuously changes, operation 533 through operation 535 may not be performed even though detecting that the RX beam for the first base station is changed. For example, if detecting that the RX beam for the first base station is changed, the electronic device may determine whether the posture of the electronic device is being changed using the sensor (e.g., the sensor module 376), and may not perform operation 533 through operation 535, if the posture of the electronic device is being changed.

Figure 6:
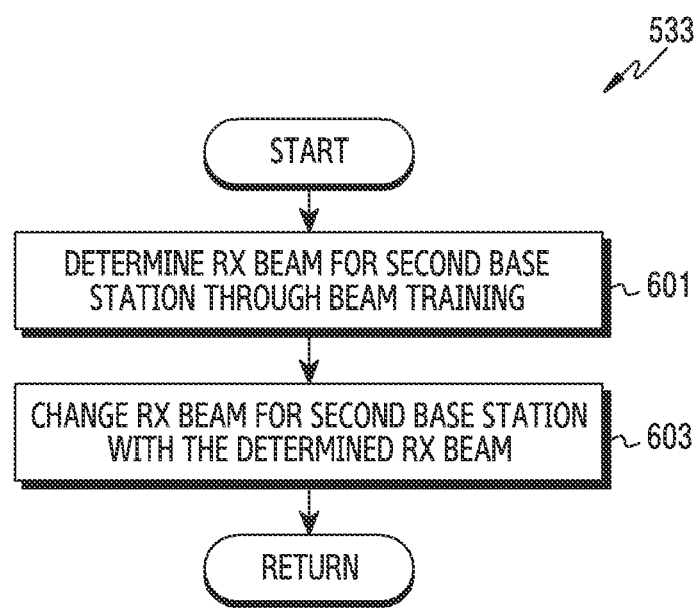
FIG. 6 is a flowchart illustrating an example of a method for changing an RX beam for a second base station in an electronic device according to various embodiments.

FIG. 6 is a flowchart illustrating an example of a method for changing an RX beam for a second base station in an electronic device according to various embodiments. The following descriptions may be specific operations of operation 533 of FIG. 5B.

Referring to FIG. 6, the electronic device (e.g., the electronic device 101, 201, or 301) may determine an RX beam for a second base station (e.g., the base station 102 or the second base station 202) through the beam training, in operation 601. For example, as shown in FIG. 2B, if the RX beam for the first base station 202 is changed, the electronic device 201 may perform the beam training with the second base station 203, and thus acquire measurement values (e.g., signal strengths) for the plurality of the beams of the electronic device 201, and determine the beam having the greatest measurement value as the RX beam for the second base station 203.

In operation 603, the electronic device may change the RX beam for the second base station to the determined RX beam.

According to various embodiments, if the RX beam for the first base station is changed as the posture of the electronic device is changed, the electronic device may determine the RX beam for the second base station, by conducting the beam training with the second base station by using the plurality of the beams of the electronic device.

Figure 7:
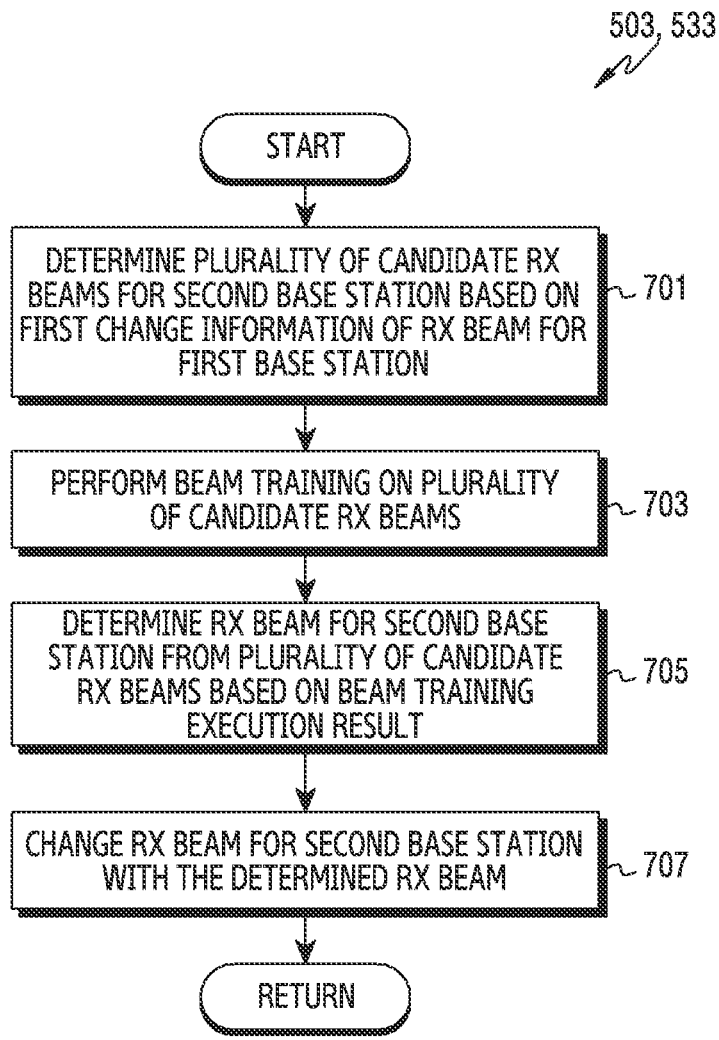
FIG. 7 is a flowchart illustrating another example of a method for changing an RX beam for a second base station in an electronic device according to various embodiments.
Figure 8A:
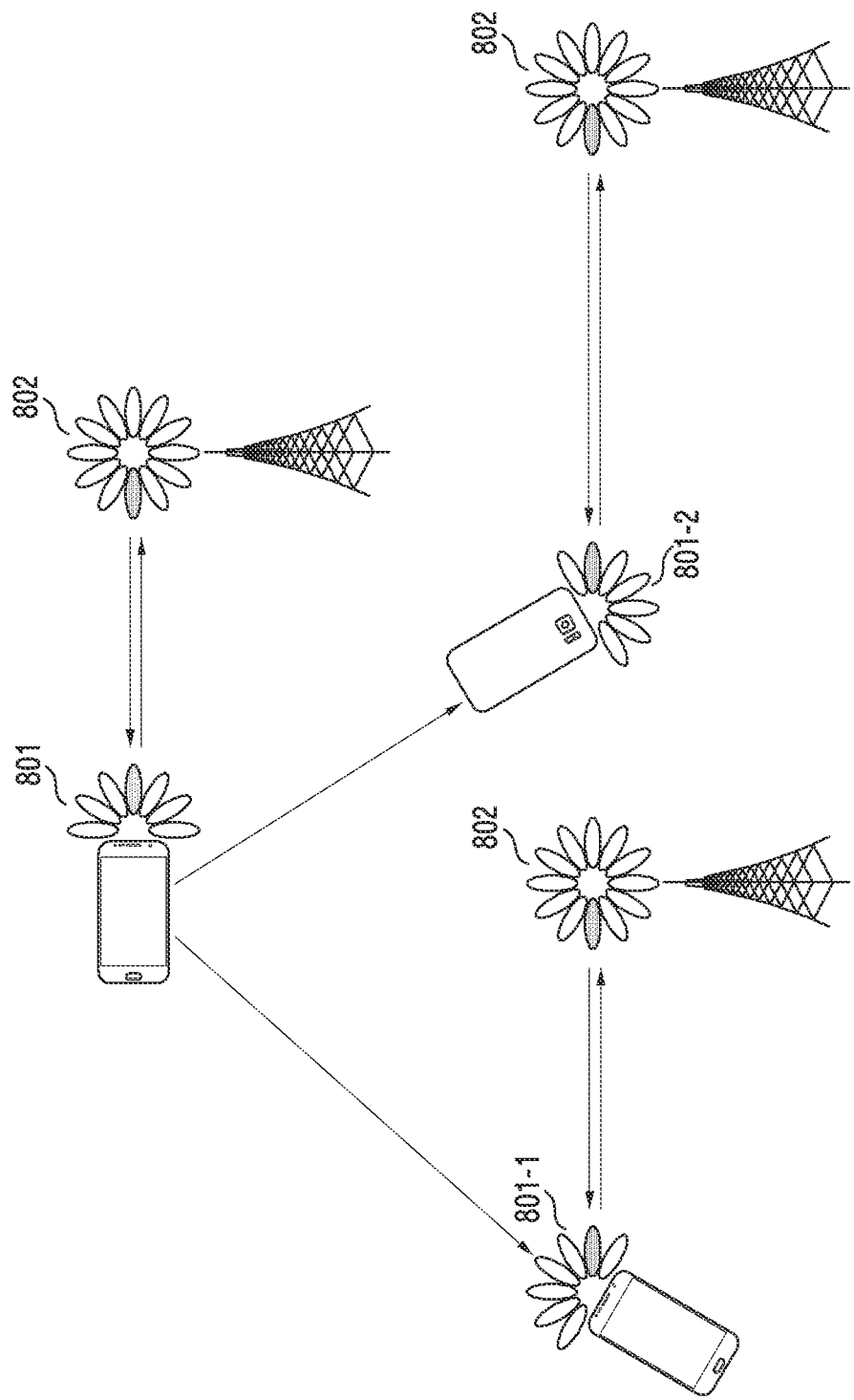
FIG. 8A and FIG. 8B illustrate an example for charging an RX beam based on a posture change of an electronic device according to various embodiments.
Figure 8B:
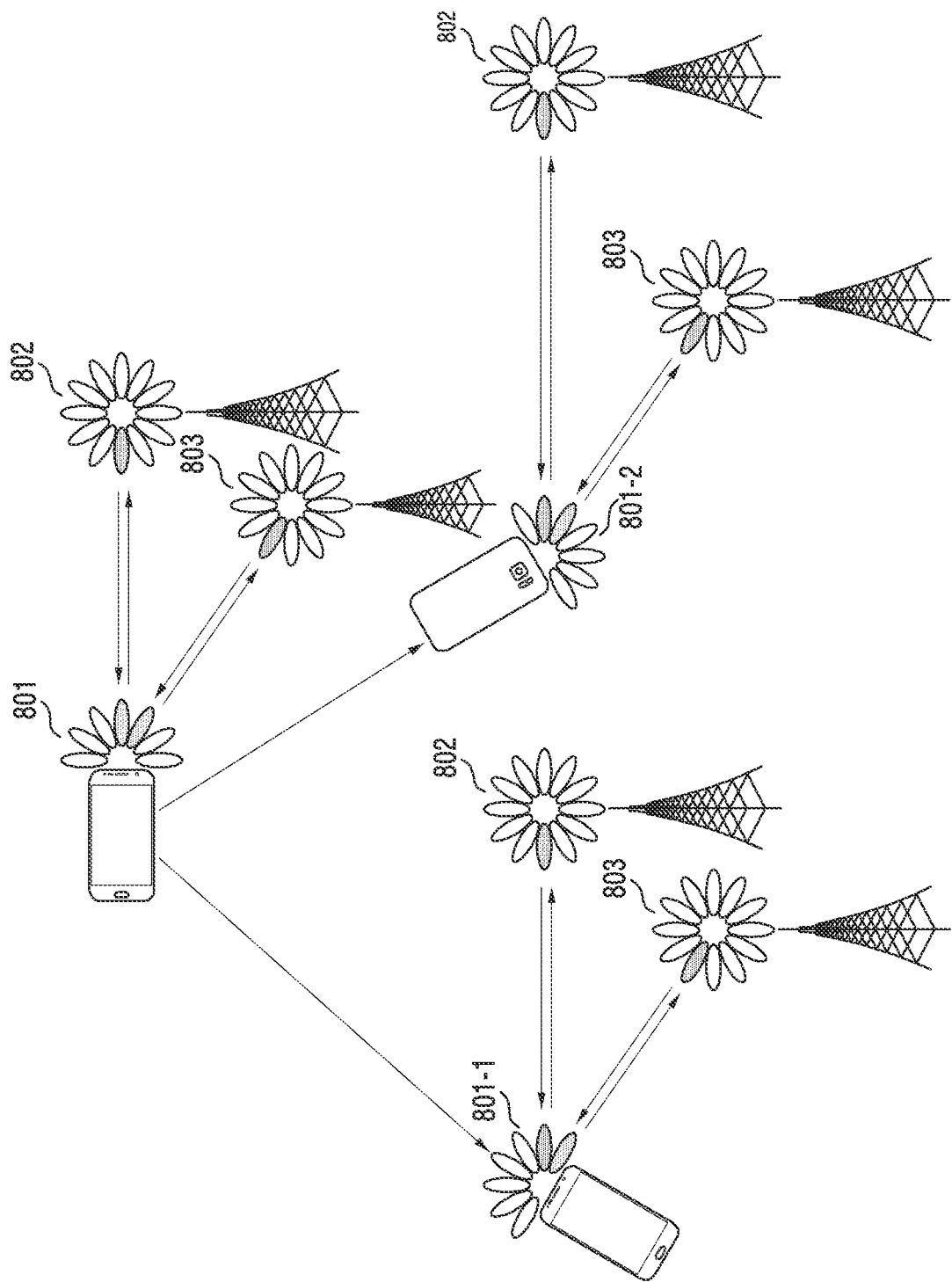

FIG. 7 is a flowchart illustrating another example of a method for changing an RX beam for a second base station in an electronic device according to various embodiments. FIG. 8A and FIG. 8B illustrate an example for charging an RX beam based on a posture change of an electronic device according to various embodiments. The following descriptions may be specific operations of operation 503 of FIG. 5A or operation 533 of FIG. 5B.

Referring to FIG. 7, in operation 701, the electronic device (e.g., the electronic device 101, 201, or 301) may determine a plurality of candidate RX beams for a second base station (e.g., the base station 102 or the second base station 203) based on first change information of an RX beam for a first base station (e.g., the base station 102 or the first base station 202). The electronic device may not specify the changed posture of the electronic device merely with the first change information of the RX beam for the first base station. For example, as shown in FIG. 8A, if the RX beam for the first base station is changed, the changed posture of the electronic device 801 causing the RX beam change may be any one of a first state 801-1 or a second state 801-2 which may be formed as an electronic device 801 rotates based on a reference axis of a direction from the changed RX beam toward the first base station. Hence, the electronic device 801 may not determine the changed posture of the electronic device 801 merely with the change information of one RX beam. Accordingly, the electronic device 801 may transmit a plurality of candidate RX beams for the second base station based on the first change information of the RX beam for the first base station 802. For example, as shown in FIG. 8B, since the direction of the second base station 803 for the electronic device 801 is maintained regardless of the changed posture (e.g., the first state 801-1 or the second state 801-2) of the electronic device, the electronic device 801 may identify a plurality of candidate RX beams which may become the RX beam for the second base station 802 from the beamform information if the electronic device 801 rotates 360 degrees based on the reference axis of the direction from the changed RX beam for the first base station 802 toward the first base station 802.

In operation 703, the electronic device may perform the beam training on the plurality of the candidate RX beams. For example, the electronic device may conduct the beam training with the second base station using the plurality of the candidate RX beams to determine the RX beam for the second base station. As another example, the electronic device may perform the beam training with the second base station first using the plurality of the candidate RX beams to determine the RX beam for the second base station, and then conduct the beam training using the remaining beams.

In operation 705, the electronic device may determine the RX beam for the second base station based on the beam training execution result. For example, if conducting the beam training with the second base station using the plurality of the candidate RX beams, the electronic device may determine the candidate beam having the lowest path loss value among the plurality of the candidate beams as the RX beam for the second base station. As another example, if performing the beam training with the second base station first using the plurality of the candidate RX beams, and then performing the beam training using the remaining beams, the electronic device may determine the candidate beam having the lowest path loss value among the plurality of the beams of the electronic device as the RX beam for the second base station.

In operation 707, the electronic device may change the RX beam for the second base station with the determined RX beam.

According to various embodiments, if the RX beam for the first base station is changed as the posture of the electronic device is changed, the electronic device may determine a plurality of candidate RX beams for the second base station using the first change information of the RX beam for the first base station, perform the beam training on the second base station using the plurality of the determined candidate RX beams, and thus determine the RX beam for the second base station. The electronic device may perform the beam training with the second base station using the plurality of the candidate RX beams, and accordingly reduce the time taken by the beam training compared with performing the beam training with the second base station using all the beams of the electronic device.

Figure 9:
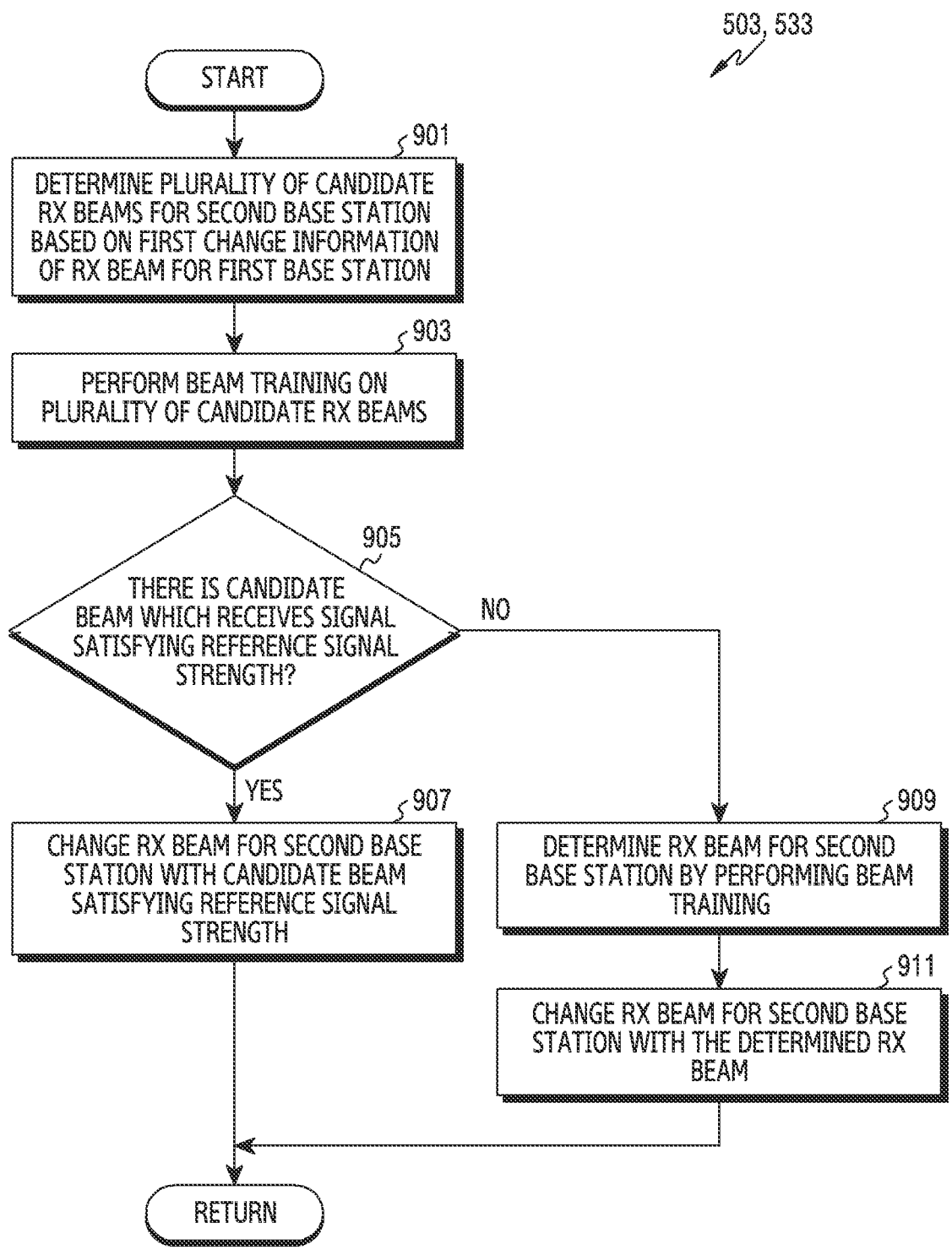
FIG. 9 is a flowchart illustrating yet another example of a method for changing an RX beam for a second base station in an electronic device according to various embodiments.

FIG. 9 is a flowchart illustrating yet another example of a method for changing an RX beam for a second base station in an electronic device according to various embodiments. The following descriptions may be specific operations of operation 503 of FIG. 5A or operation 533 of FIG. 5B.

Referring to FIG. 9, in operation 901, the electronic device (e.g., the electronic device 101, 201, or 301) may determine a plurality of candidate RX beams for a second base station (e.g., the base station 102 or the second base station 203) based on first change information of an RX beam for a first base station (e.g., the base station 102 or the first base station 202). For example, as shown in operation 701 of FIG. 7, the electronic device may identify from the beambook information the plurality of the candidate RX beams which may become the RX beam for the second base station if the electronic device is rotated 360 degrees based on the changed RX beam for the first base station.

In operation 903, the electronic device may perform the beam training on the plurality of the candidate RX beams. For example, the electronic device may perform the beam training with the second base station using the plurality of the candidate RX beams.

In operation 905, the electronic device may determine whether there is a candidate RX beam of which a measurement satisfies a reference signal strength among the plurality of the candidate RX beams. For example, the electronic device may determine whether there is the candidate RX beam which receives a signal satisfying the reference signal strength, by measuring the strength of the signal received from the second base station through each of the plurality of the candidate RX beams. The electronic device may perform operation 907 if there is the candidate RX beam which receives the signal satisfying the reference signal strength, and perform operation 909 if there is no candidate RX beam which receives the signal satisfying the reference signal strength.

In operation 907, the electronic device may determine the RX beam for the second base station to the candidate RX beam which receives the signal satisfying the reference signal strength in response to determining that there is the candidate RX beam which receives the signal satisfying the reference signal strength. According to various embodiments, if there are multiple candidate RX beams which receive the signal satisfying the reference signal strength, the electronic device may determine the candidate RX beam which receive the signal of the greatest signal strength value as the RX beam for the second base station.

In operation 909, the electronic device may determine the RX beam for the second base station by performing the beam training in response to determining that there is no candidate RX beam satisfying the reference signal strength. For example, the electronic device may determine the RX beam for the second base station, by performing the beam training with the second base station using the other beams than the candidate RX beam among the plurality of the beams of the electronic device.

In operation 911, the electronic device may change the RX beam for the second base station with the determined RX beam.

According to various embodiments, the electronic device may determine a plurality of candidate RX beams for the second base station by using first change information of the RX beam for the first base station, and determine the candidate RX beam receiving the signal which satisfies the reference signal strength among the plurality of the determined candidate RX beams to the RX beam for the second base station. If determining the candidate RX beam which receives the signal satisfying the reference signal strength among the plurality of the candidate RX beams to the RX beam for the second base station, the electronic device may perform the beam training on all the beams of the electronic device and thus reduce the time taken by the beam training compared with determining the RX beam for the second base station.

Figure 10:
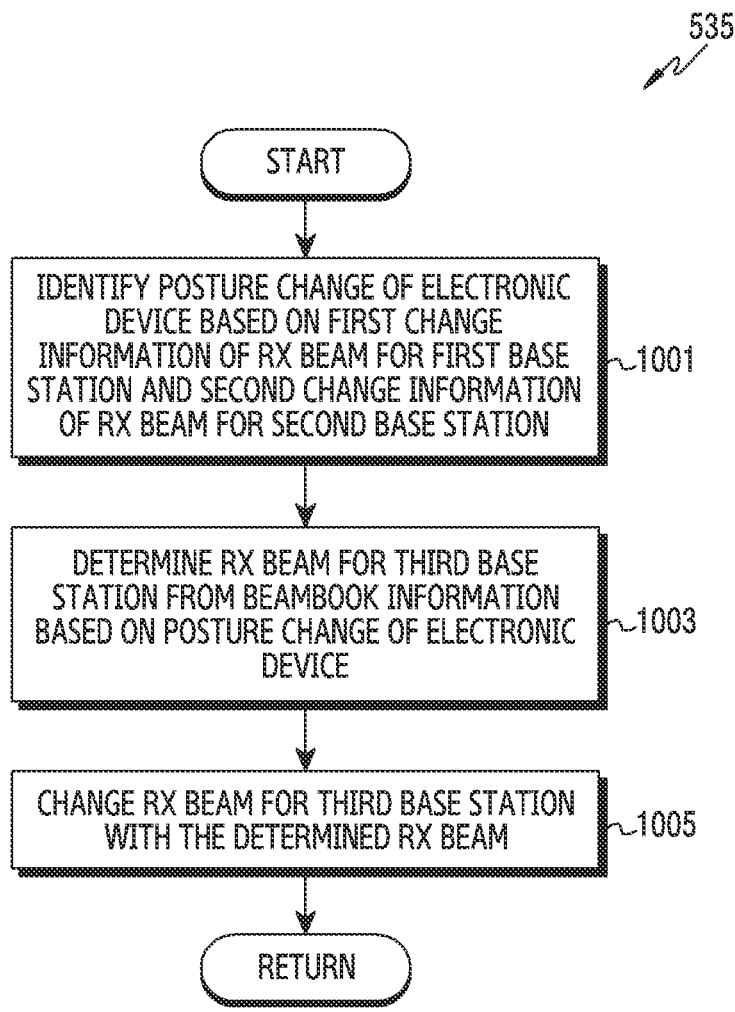
FIG. 10 is a flowchart illustrating an example of a method for determining an RX beam for a third base station in an electronic device according to various embodiments.
Figure 11A:
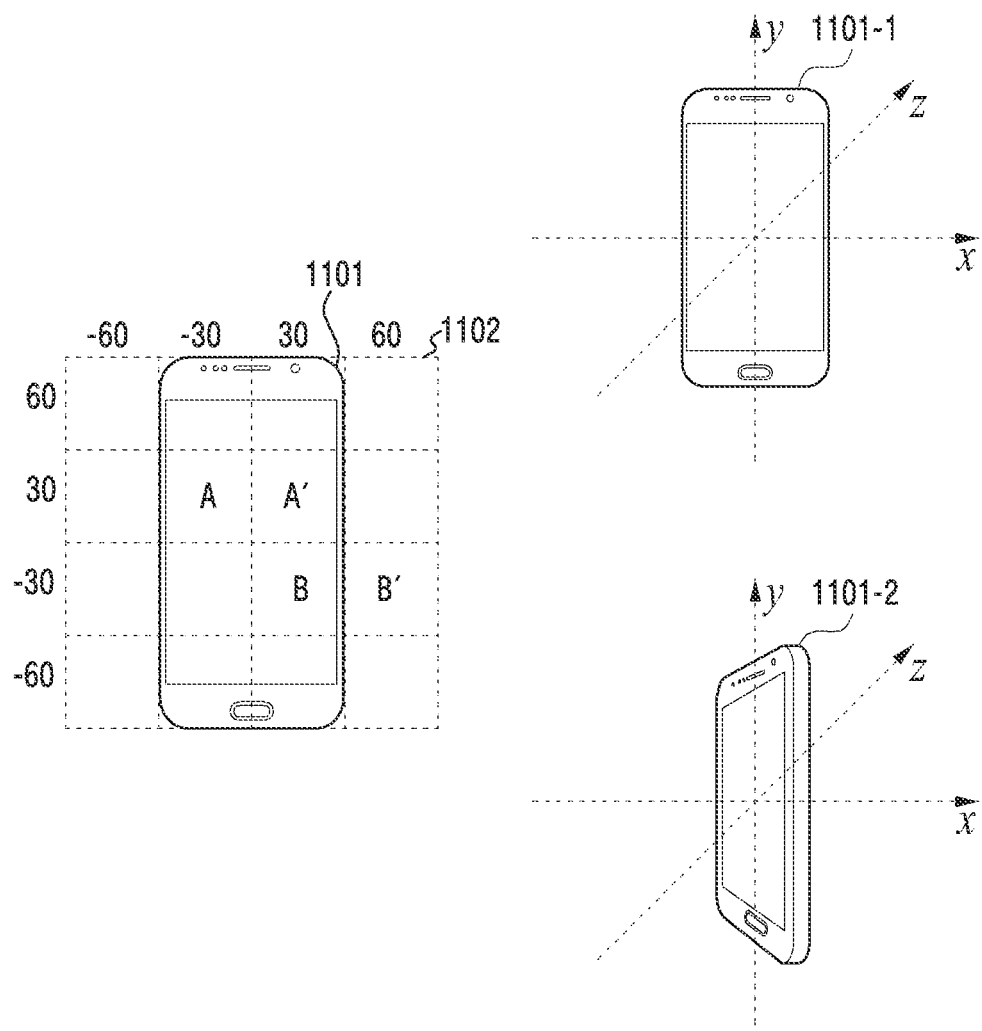
FIG. 11A and FIG. 11B are diagrams for illustrating a method for identifying a posture change of an electronic device according to various embodiments.
Figure 11B:
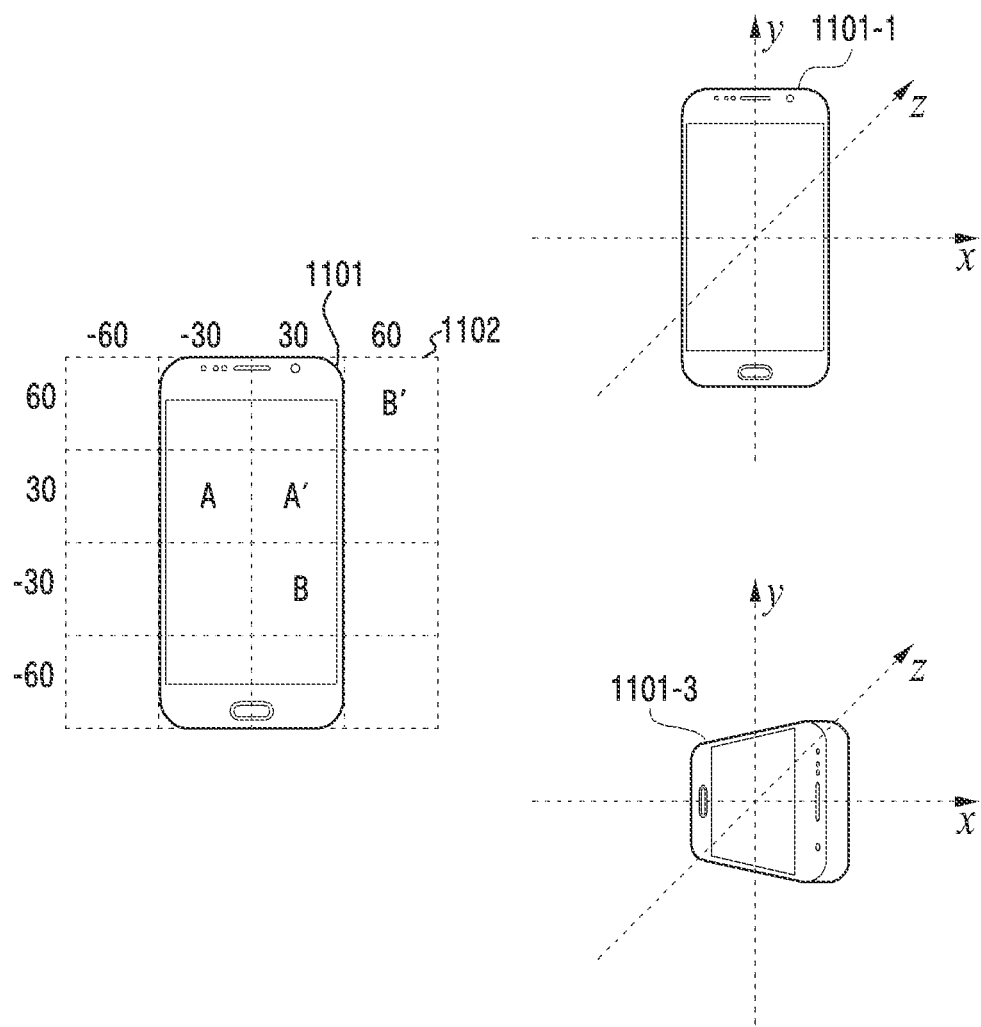

FIG. 10 is a flowchart illustrating an example of a method for determining an RX beam for a third base station in an electronic device according to various embodiments. FIG. 11A and FIG. 11B are diagrams for illustrating a method for identifying a posture change of an electronic device according to various embodiments. The following descriptions may be specific operations of operation 535 of FIG. 5B.

Referring to FIG. 10, in operation 1001, the electronic device (e.g., the electronic device 101, 201, or 301) may identify a posture change of the electronic device based on first change information of an RX beam for a first base station (e.g., the first base station 202) and/or second change information of an RX beam for a second base station (e.g., the second base station 203). For example, as shown in FIG. 11A, if identifying from beambook information 1102 that the RX beam for the first base station is changed from a beam A to a beam A' and the RX beam for the second base station is changed from a beam B to a beam an electronic device 1101 may identify that the posture of the electronic device 1101 is changed from a first state 1101-1 to a second state 1101-2 (e.g., rotated 60 degrees clockwise based on the X axis) based on rotation angle information mapped to each of the beams of the beambook information 1102. As another example, as shown in FIG. 11B, if identifying from the beambook information 1102 that the RX beam for the first base station is changed from the beam A to the beam A' and the RX beam for the second base station is changed from the beam B to the beam the electronic device 1101 may identify that the posture of the electronic device 1101 is changed from the first state 1101-1 to a third state 1101-3 (e.g., rotated 60 degrees clockwise based on the X axis, and rotated 90 degrees clockwise based on the Y axis) based on the rotation angle information mapped to the beambook information 1102. According to various embodiments, the number and the angle information of the beams included in the beambook information 1102 of the electronic device 1101 may be changed according to the number, location, size, and/or characteristics of the antenna modules included in the electronic device.

In operation 1003, the electronic device may determine the RX beam for the third base station (e.g., the third base station 204) from the beambook information based on the posture change of the electronic device. For example, as shown in FIG. 11A, if identifying that the posture of the electronic device is changed from the first state 1101-1 to the second state 1101-2, the electronic device may identify from the beambook information 1102 the beam corresponding to the angle rotated 60 degrees clockwise based on the X axis from the RX beam for the third base station before the posture of the electronic device is changed. The electronic device may determine the identified beam as the RX beam for the third base station.

In operation 1005, the electronic device may change the RX beam for the third base station with the determined RX beam.

According to various embodiments, the electronic device may identify the posture change of the electronic device based on the first change information of the RX beam for the first base station and/or the second change information of the RX beam for the second base station, and determine and change the RX beam for the third base station from the beambook information based on the posture change of the electronic device. As the electronic device does not perform the beam training for determining the RX beam for the third base station, it may save the time taken by the beam training.

So far, it has been described that the electronic device identifies the posture of the electronic device by using the change information of the RX beams for the two base stations, but according to various embodiments, the electronic device may identify the posture change of the electronic device using a posture change value measured using the sensor (e.g., the sensor module 376).

Figure 12:
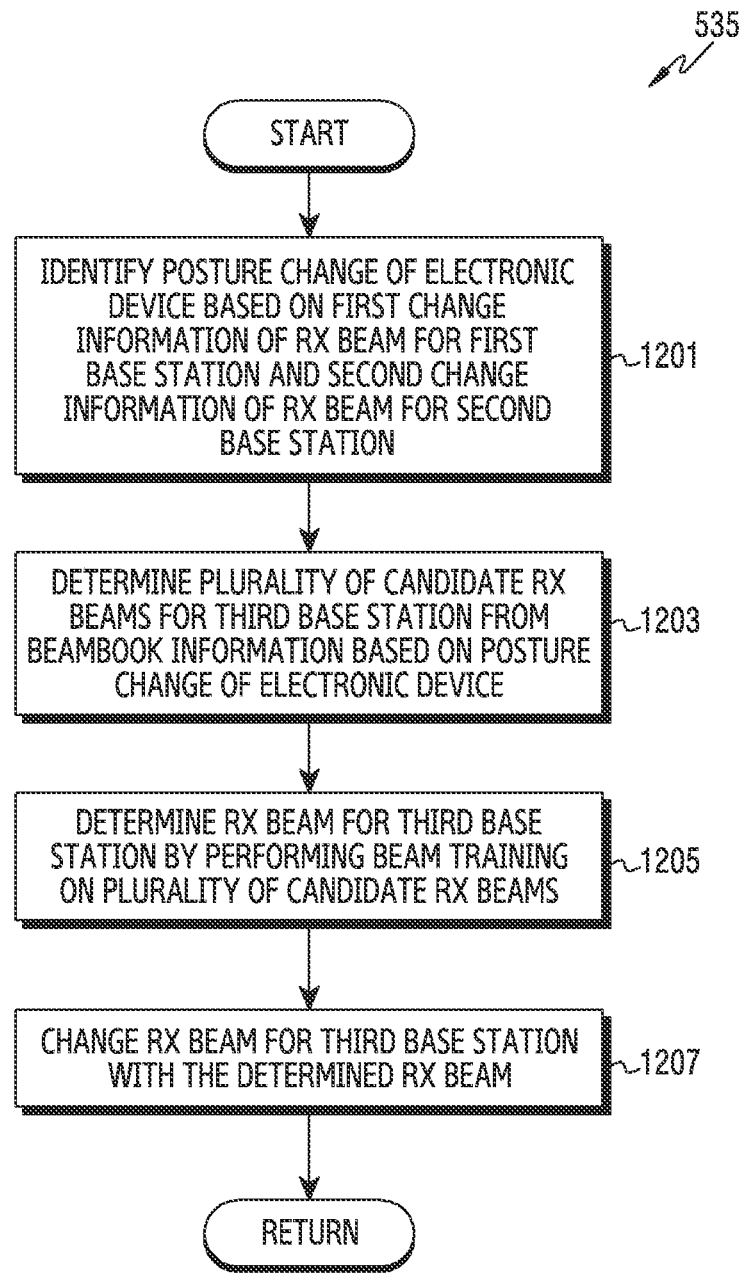
FIG. 12 is a flowchart illustrating another example of a method for determining an RX beam for a third base station through an electronic device according to various embodiments.

FIG. 12 is a flowchart illustrating another example of a method for determining an RX beam for a third base station in an electronic device according to various embodiments. The following descriptions may be specific operations of operation 535 of FIG. 5B.

Referring to FIG. 12, in operation 1201, the electronic device (e.g., the electronic device 101, 201, or 301) may identify a posture change of the electronic device based on first change information of an RX beam for a first base station (e.g., the first base station 202) and/or second change information of an RX beam for a second base station (e.g., the second base station 203). For example, the electronic device may identify the posture change of the electronic device in the same or similar manner to operation 1101 of FIG. 10.

In operation 1203, the electronic device may determine a plurality of candidate RX beams for a third base station from beambook information based on the posture change of the electronic device. For example, the electronic device may determine the RX beam for the third base station in the same or similar manner to operation 1003 of FIG. 10. The electronic device may determine at least one neighboring beam adjacent to the RX beam for the third base station determined from the beambook information as a candidate RX beam for the third base station. According to various embodiments, the number and the angle information of the beams included in the beambook information 1102 of the electronic device 1101 may be changed according to the number, location, size, and/or characteristics of the antenna modules included in the electronic device.

In operation 1205, the electronic device may determine the RX beam for the third base station, by performing the beam training on the plurality of the candidate RX beams. For example, the electronic device may determine one of the candidate RX beams as the RX beam for the third base station, by performing the beam training with the third base station using the candidate RX beams among the plurality of the beams of the electronic device. As another example, the electronic device may perform the beam training with the third base station first using the candidate RX beams among the plurality of the beams of the electronic device, and then perform the beam training with the third base station using the remaining beams. If there is a candidate RX beam which receives a signal satisfying a reference signal strength among the candidate RX beams while performing the beam training operation using candidate RX beams, the operation for beam training using the remaining beams may be omitted. In this case, if there are a plurality of candidate RX beams which receive the signal satisfying the reference signal strength, the candidate RX beam of the greatest signal strength measurement value may be determined as the RX beam for the third base station.

In operation 1207, the electronic device may change the RX beam for the third base station to the determined RX beam.

As described above, the electronic device may determine the candidate RX beams for the third base station based on the posture change of the electronic device, perform the beam training using only the determined candidate RX beams or perform the beam training first using the determined candidate RX beams, and thus reduce the time taken for the beam training.

So far, while it has been described that the electronic device identifies the posture of the electronic device by using the change information of the RX beams for the two base stations, according to various embodiments, the electronic device may identify the posture change of the electronic device using the posture change value measured through the sensor (e.g., the sensor module 376).

An operating method of an electronic device according to various embodiments may include detecting that a reception beam for a first base station is changed, and changing a reception beam for a second base station based on first change information of the reception beam for the first base station.

According to various embodiments, changing the reception beam for the second base station may include determining a plurality of candidate reception beams for the second base station based on the first change information, performing beam training on the plurality of the candidate reception beams, determining the reception beam for the second base station from the plurality of the candidate reception beams based on an execution result of the beam training, and changing the reception beam for the second base station with the determined reception beam.

According to various embodiments, changing the reception beam for the second base station may include determining a plurality of candidate reception beams for the second base station based on the first change information, performing beam training on the plurality of the candidate reception beams, and if there is a candidate beam which receives a signal satisfying a reference signal strength among the plurality of the candidate reception beams, changing the reception beam for the second base station with the candidate reception beam which receives the signal satisfying the reference signal strength.

According to various embodiments, the operating method of the electronic device may further include, if there are multiple candidate reception beams which receive the signal satisfying the reference signal strength, changing the candidate reception beam which receives the signal of the greatest signal strength value with the reception beam for the second base station.

According to various embodiments, the operating method of the electronic device may further include, if there is no candidate reception beam which receives the signal satisfying the reference signal strength, determining the reception beam for the second base station, by performing beam training on a plurality of beams of the electronic device, and changing the reception beam for the second base station with the determined beam.

According to various embodiments, the operating method of the electronic device may further include changing a reception beam for a third base station based on the first change information and second change information of the reception beam for the second base station.

According to various embodiments, changing the reception beam for the third base station may include identifying a posture change of the electronic device based on the first change information and the second change information, determining the reception beam for the third base station from beambook information of the electronic device based on the posture change of the electronic device, and changing the reception beam for the third base station with the determined beam.

According to various embodiments, changing the reception beam for the third base station may include identifying a posture change of the electronic device based on the first change information and the second change information, determining a plurality of candidate reception beams for the third base station from beambook information of the electronic device based on the posture change of the electronic device, determining the reception beam for the third base station by performing beam training on the plurality of the candidate reception beams, and changing the reception beam for the third base station with the determined beam.

According to various embodiments, the operating method of the electronic device may further include, if a moving speed of the electronic device is equal to or greater than a reference moving speed, determining the reception beams for the first base station, the second base station, and the third base station, by performing beam training on the first base station, the second base station, and the third base station.

According to various embodiments, the first change information may include a 3-axis rotation value of the reception beam for the first base station, and the second change information may include a 3-axis rotation value of the reception beam for the second base station.

The term "module" used in this disclosure may include a unit implemented in hardware, software or firmware, and may be interchangeably used with other term, for example, logic, logic block, part, or circuitry. The module may be a single integral component, or a minimum unit or part thereof, for performing one or more functions. For example, according to an embodiment, the module may be implemented in a form of an application-specific integrated circuit (ASIC).

Various embodiments of the present disclosure may be implemented as software (e.g., the program 340) including one or more instructions which are stored in a storage medium (e.g., the internal memory 336 or the external memory 338) readable by a machine (e.g., the electronic device 301). For example, a processor (e.g., the processor 320) of the machine (e.g., the electronic device 301) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, 'non-transitory' simply means that the storage medium is a tangible device, and does not include a signal (e.g., an electromagnetic wave), but this term does not differentiate between where data is semi-permanently stored in the storage medium and where the data is temporarily stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) directly or online via an application store (e.g., Play Store™), or between two user devices (e.g., smart phones). If distributed online, at least part of the computer program product may be temporarily stored in the machine-readable storage medium such as a memory of a manufacturer's server, a server of the application store, or a relay server, or may be temporarily generated.

According to various embodiments, each component (e.g., a module or a program) of the above-described components may include a single entity or multiple entities. According to various embodiments, one or more component or operations of the above-described components may be omitted, or one or more other components or operations may be added. Alternatively or additionally, a plurality of components (e.g., modules or programs) may be integrated as a single component. In this case, the integrated component may perform one or more functions of each component of the plurality of components in the same or similar manner as they are performed by a corresponding component of the plurality of components before the integration. According to various embodiments, operations performed by the module, the program, or other component may be carried out sequentially, in parallel, repeatedly, or heuristically, or one or more of the operations may be executed in a different order or omitted, or one or more other operations may be added.

The invention claimed is:

1. An electronic device comprising:
a communication circuit; and
a processor operatively connected with the communication circuit,
wherein the processor is configured to:
  detect that a reception beam for a first base station is changed,
  determine a plurality of candidate reception beams for a second base station based on first change information of the reception beam for the first base station,
  perform beam training on the plurality of the candidate reception beams,
  determine a reception beam for the second base station from the plurality of the candidate reception beams based on an execution result of the beam training, and
  change the reception beam for the second base station with the determined reception beam.

2. The electronic device of claim 1, wherein the processor is further configured to:
  if there is a candidate beam which receives a signal satisfying a reference signal strength among the plurality of the candidate reception beams, change the reception beam for the second base station with the candidate reception beam which receives the signal satisfying the reference signal strength.

3. The electronic device of claim 2, wherein the processor is further configured to:
  if there are multiple candidate reception beams which receive the signal satisfying the reference signal strength, change the candidate reception beam which receives the signal of the greatest signal strength value with the reception beam for the second base station.

4. The electronic device of claim 1, wherein the processor is further configured to:
  change a reception beam for a third base station based on the first change information and second change information of the reception beam for the second base station.

5. The electronic device of claim 4, wherein the processor is further configured to:
  identify a posture change of the electronic device based on the first change information and the second change information,
  determine the reception beam for the third base station from beambook information of the electronic device based on the posture change of the electronic device, and
  change the reception beam for the third base station with the determined reception beam for the third base station.

6. The electronic device of claim 4, wherein the processor is further configured to:
  identify a posture change of the electronic device based on the first change information and the second change information,
  determine a plurality of candidate reception beams for the third base station from beambook information of the electronic device based on the posture change of the electronic device,
  determine the reception beam for the third base station by performing beam training on the plurality of the candidate reception beams, and
  change the reception beam for the third base station with the determined reception beam for the third base station.

7. An electronic device comprising:
a communication circuit; and
a processor operatively connected with the communication circuit,
wherein the processor is configured to:
- detect that a reception beam for a first base station is changed,
- change a reception beam for a second base station based on first change information of the reception beam for the first base station,
- determine a plurality of candidate reception beams for the second base station based on the first change information,
- perform beam training on the plurality of the candidate reception beams,
- if there is a candidate beam which receives a signal satisfying a reference signal strength among the plurality of the candidate reception beams, change the reception beam for the second base station with the candidate reception beam which receives the signal satisfying the reference signal strength,
- if there is no candidate reception beam which receives the signal satisfying the reference signal strength, determine the reception beam for the second base station, by performing beam training on a plurality of beams of the electronic device, and
- change the reception beam for the second base station with the reception beam determined by performing beam training on the plurality of beams of the electronic device.

8. A method of operating an electronic device, the method comprising:
- detecting that a reception beam for a first base station is changed;
- determining a plurality of candidate reception beams for a second base station based on first change information of the reception beam for the first base station;
- performing beam training on the plurality of the candidate reception beams;
- determining a reception beam for the second base station from the plurality of the candidate reception beams based on an execution result of the beam training; and
- changing the reception beam for the second base station with the determined reception beam.

9. The method of claim 8, further comprising:
if there is a candidate beam which receives a signal satisfying a reference signal strength among the plurality of the candidate reception beams, changing the reception beam for the second base station with the candidate reception beam which receives the signal satisfying the reference signal strength.

10. The method of claim 9, further comprising:
if there are multiple candidate reception beams which receive the signal satisfying the reference signal strength, changing the candidate reception beam which receives the signal of the greatest signal strength value with the reception beam for the second base station.

11. The method of claim 8, further comprising:
changing a reception beam for a third base station based on the first change information and second change information of the reception beam for the second base station.

12. The method of claim 11, wherein the changing of the reception beam for the third base station comprises:
- identifying a posture change of the electronic device based on the first change information and the second change information;
- determining the reception beam for the third base station from beambook information of the electronic device based on the posture change of the electronic device; and
- changing the reception beam for the third base station with the determined reception beam for the third base station.

13. A method of operating an electronic device, the method comprising:
- detecting that a reception beam for a first base station is changed;
- changing a reception beam for a second base station based on first change information of the reception beam for the first base station;
- determining a plurality of candidate reception beams for the second base station based on the first change information;
- performing beam training on the plurality of the candidate reception beams;
- if there is a candidate beam which receives a signal satisfying a reference signal strength among the plurality of the candidate reception beams, changing the reception beam for the second base station with the candidate reception beam which receives the signal satisfying the reference signal strength;
- if there is no candidate reception beam which receives the signal satisfying the reference signal strength, determining the reception beam for the second base station, by performing beam training on a plurality of beams of the electronic device; and
- changing the reception beam for the second base station with the [determined] reception beam determined by performing beam training on the plurality of beams of the electronic device.

* * * * *